United States Patent [19]

Imoto et al.

[11] Patent Number: 4,953,934

[45] Date of Patent: Sep. 4, 1990

[54] WAVEGUIDE TYPE LIGHT MERGING AND BRANCHING DEVICE

[75] Inventors: Katsuyuki Imoto, Hitachi; Hirohisa Sano, Kokubunji; Masaru Miyazaki, Ome; Naoyuki Matsuoka, Kokubunji; Hisato Uetsuka, Hitachi, all of Japan

[73] Assignees: Hitachi, Ltd.; Hitachi Cable, Ltd., Tokyo, Japan

[21] Appl. No.: 280,855

[22] Filed: Dec. 7, 1988

[30] Foreign Application Priority Data

Dec. 9, 1987 [JP] Japan ................................ 62-309652

[51] Int. Cl.⁵ .............................................. G02B 6/26
[52] U.S. Cl. ............................. 350/96.15; 350/96.13; 350/96.14
[58] Field of Search ............... 350/96.12, 96.13, 96.14, 350/96.15

[56] References Cited

U.S. PATENT DOCUMENTS

| | | | |
|---|---|---|---|
| 4,006,963 | 2/1977 | Baues et al. | 350/96.14 |
| 4,648,687 | 3/1987 | Yoshida et al. | 350/96.13 |
| 4,671,605 | 6/1987 | Soref | 350/96.15 |
| 4,674,827 | 6/1987 | Izutsu et al. | 350/96.15 X |

FOREIGN PATENT DOCUMENTS

| | | | |
|---|---|---|---|
| 0185308 | 10/1984 | Japan | 350/96.15 |
| 0208509 | 11/1984 | Japan | 350/96.15 |
| 0249117 | 12/1985 | Japan | |
| 2191013 | 12/1987 | United Kingdom | 350/96.15 |

OTHER PUBLICATIONS

N. Takato et al., "Low-Loss Directional Coupler Using High-Silica Embedded Channel Waveguides", First Optoelectronics Conference (OEC '86), Technical digest, Jul., 1986.

Primary Examiner—Eugene R. LaRoche
Assistant Examiner—Seung Ham
Attorney, Agent, or Firm—Pennie & Edmonds

[57] ABSTRACT

A waveguide type light merging and branching device, in which a resistance layer is disposed on a surface of a substrate or at least on one side therein and a low refractive index layer (refractive index $n_b$), a core waveguide layer (refractive index $n_c$, $n_c > n_b$), and a cladding layer (refractive index $n_n$, $n_n > n_c$) superposed thereon on each other, the resistance layer having electrode terminals at the two extremities thereof, to which a voltage is applied.

2 Claims, 4 Drawing Sheets

A-A' SECTIONAL PLAN

WAVEGUIDE TYPE LIGHT MERGING AND BRANCHING DEVICE

BACKGROUND OF THE INVENTION

This invention relates to a waveguide type light merging and branching device capable of electrically finely regulating wavelength characteristics of the light merging and branching device.

Light wavelength multiple transmission techniques in the communication using optical fiber are important for making a communication system more economical. A light merging and branching device is an inevitable device for the light wavelength multiple transmission. Recently a movement to investigate a waveguide type structure as a construction of the light merging and branching device for the purpose of decreasing the cost and fabricating it in a one-chip monolithic form has taken place. As an example thereof there is known a directional coupler type light branching device (N. Takato et al. : "Low-loss Directional Coupler Using High-silica Embedded Channel Waveguides" first Optoelectronics Conference (OEC '86) Technical Digest, July, 1986). As indicated in FIGS. 4A and 4B, there is disclosed a method, by which two light waveguides are arranged parallelly and light branching characteristics are obtained by utilizing the wavelength dependence of the coupling of the two light waveguides.

Since the prior art directional coupling type light branching device described above has a simple construction, it has a feature that it can be easily fabricated. However, there is a problem that the central wavelength is shifted due to variations in constructional parameters during the fabrication process. Therefore, decrease in the fabrication yield was inevitable. FIGS. 5A, 5B and 5C indicate results of the sensitivity analysis for the light branching device, which the inventors of this invention have obtained by calculations. In the figures the abscissa represents the wavelength and the ordinate the loss. FIG. 5A indicates results obtained in the case where the core width W of the waveguide is deviated by ±5% from a designed value of 10 μm and FIG. 5B indicates those obtained in the case where the core thickness T of the waveguide is deviated by ±5% from a designed value of 8 μm. As it can be seen from these figures, the deviations of the constructional parameters shift relatively the central wavelength. It can be understood that the wavelength shift is sensitive to the deviations in W among those described above. Such a wavelength shift gives rise to deterioration of cross talk characteristics between channels In the prior art light branching device the central wavelength shift due to variations in the constretional parameters is inevitable. Since the devices, in which the central wavelength shift has taken place, could not be used in practice, this gave rise to decrease in the fabrication yield.

SUMMARY OF THE INVENTION

The object of this invention is to provide a waveguide type light merging and branching device, in which it is possible to correct the central wavelength shift described above. As a result, the light merging and branching devices, which heretofore could not be used in practice because of the central wavelength shift, become useful, which gives rise to remarkable cost reduction of light merging and branching devices. Further, since it is possible to control automatically the central wavelength shift due to variations in environmental conditions, when they are used in a real system, it is possible to suppress cross talk between channels due to interference between different optical signal wavelengths.

The above object can be achieved by a waveguide type light merging and branching device having a structure, in which a resistance layer is disposed on or within a substrate and a low refractive index layer (refractive index $n_b$), a core waveguide (refractive index $n_c$, $n_c > n_b$) and a cladding layer (refractive index $n_n$, $n_n > n_c$) are superposed thereon on each other, electrode terminals being disposed at the two extremities of this resistance layer, to which a voltage is applied.

The voltage stated above is controlled so that the output of a thermo-detecting element disposed in the light merging and branching device has a predetermined value. Further a plurality of the directional couplers described above are combined and a photosensitive element is mounted at least one output terminal of the directional couplers, the output of the photosensitive element being controlled so as to have a predetermined value. That is, it is well known that, in general, the refractive index of substances such as dielectric substances (glass, plastics, etc.), semiconductors (Si, Ge, GaAs, etc.) etc. varies, depending on the temperature. The ratio of the variation Δn of the refractive index n with respect to temperature can be represented approximately by;

$$\frac{\Delta n}{n} \approx A - B\alpha T \qquad (1)$$

where
A, B: constant,
α: thermal expansion coefficient, and
T: temperature.

For example it is known that for glass, the ratio of the variation of the refractive index with respect to temperature for $SiO_2$, in which oxide such as $B_2O_3$, $P_2O_5$, $GeO_2$, etc. is mixed, is greater than that for $SiO_2$. Furthermore it is known also that the thermal expansion coefficient is increased with increasing amount of oxide such as $P_2O_5$, $B_2O_3$, $GeO_2$, etc. added to $SiO_2$. On the other hand, as stated previously, when the refractive indices (e.g. $n_b$, $n_c$, $n_n$) of the waveguide of the directional coupling type light merging and branching device are varied, the central wavelength in the light branching characteristics is shifted relatively. Consequently it is possible to control the central wavelength in the light branching characteristics, while varying the temperature by making current flow through the resistance layer. The fabrication of the resistance layer in or on the surface of a substrate, e.g. Si, can be easily realized by a usual semiconductor process. Furthermore, since it is fabricated before the formation of a waveguide layer, it does not hinder the formation of the waveguide layer at all. In addition, since this resistance layer and the terminals can be used as marks for mask alignment for a waveguide pattern, it is possible to realize a great area pattern with a high dimensional precision.

DESCRIPTION OF THE PREFERRED EMBODIMENTS

Figure 1:
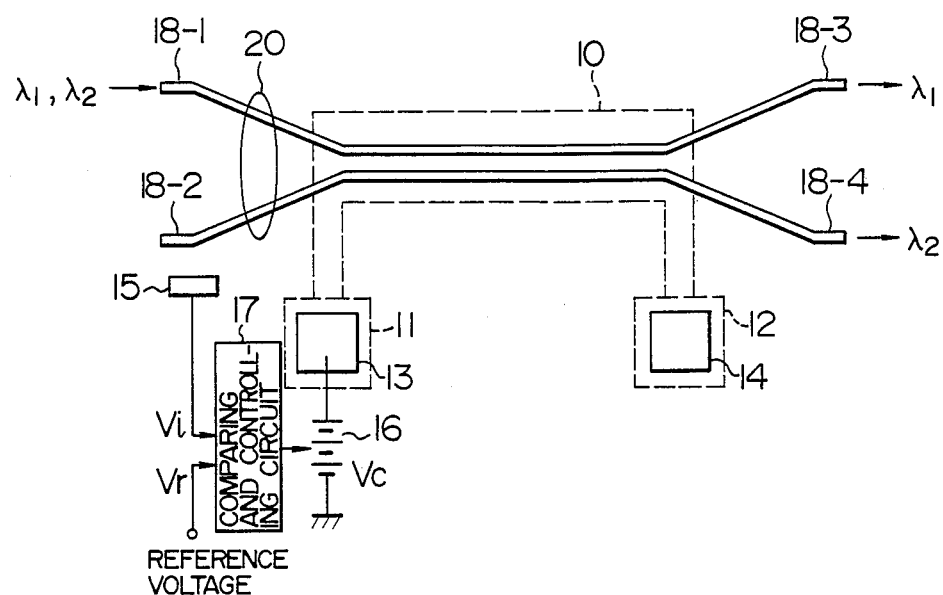
FIG. 1 is a scheme illustrating the construction of a waveguide type light merging and branching device, which is an embodiment of this invention.
Figure 2:
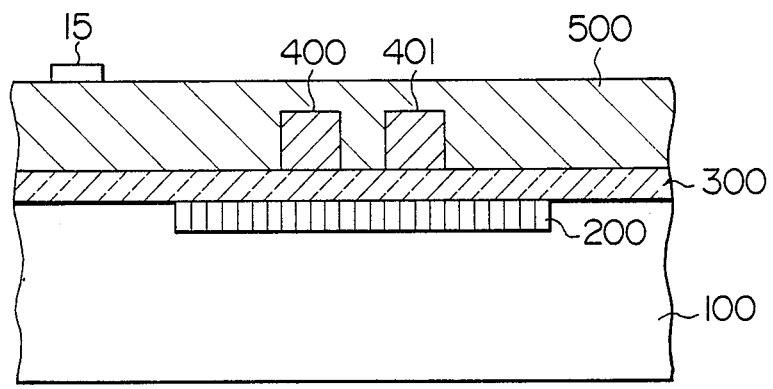
FIG. 2 is a cross sectional view of the device indicated in FIG. 1.

An embodiment of this invention will be explained below, referring to FIGS. 1 and 2. In this embodiment a heater 10 is buried below an optical directional coupler 20. The heater 10 is fed with current through terminals 13 and 14. FIG. 2 is a cross sectional view illustrating the construction of this heater. A p conductivity type resistance layer 200 having a sheet resistance of 1 to 10 kΩ/square is formed by B ion implantation or B diffusion only in the region indicated by a broken line in FIG. 1 in an n conductivity type Si substrate. Further p+ conductivity type high impurity concentration layers are formed in electrode forming portions for this heater. Then an SiO$_2$ layer 300 about 8 μm thick is deposited on the upper surface of the Si substrate 100 by the CVD method and waveguides 400 and 401 are formed by the usual method. All these elements are covered by a cladding layer. Throughholes are formed at predetermined portions so as to expose the surface of the Si substrate in order to take out the electrodes for the heater and Al electrodes 13 and 14 are formed there. Thereafter, each chip is cutout from the Si substrate and mounted in a package after having connected optical fibers with the light waveguide 20 and bonded leads to the electrodes for the heater. The resistance layer 200 and the terminals 13, 14 can be used also as the marks for mask alignment, when the pattern of the light merging and branching device is formed by photolithography. For this reason, it is possible to realize a great area pattern using a plurality of masks with a high dimensional precision. The method for controlling the central wavelength by regulating the temperature in the embodiment described above will be explained. At first a reference voltage $V_r$ corresponding to a desired temperature is inputted in one of the input terminals of a comparing and controlling circuit 17. This $V_r$ is so determined that for light signals of wavelengths $\lambda_1$ and $\lambda_2$ injected in a waveguide 18-1 a light signal of wavelength $\lambda_1$ and that of wavelength $\lambda_2$ are taken out from waveguides 18-3 and 18-4, respectively. That is, $V_c$ is controlled so that the central wavelength shift is 0, while monitoring the light outputs of the output waveguides 18-3 and 18-4 e.g. by means of a light spectrum analyzer, and the $V_i$ value at that time is measured, this $V_i$ value being adopted as the $V_r$ value. In the case where a central wavelength shift is produced due to variations in the temperature in the environments, the comparing and controlling circuit is driven to effect a feedback control so that $V_r = V_i$. An electric signal $V_i$ from a thermo-detecting element 15 (e.g. a Peltier element) mounted in the cladding 500 is inputted in the other input terminal of the comparing and controlling circuit 17 so as to be compared with $V_r$ in the comparing and controlling circuit 17. In the case where $V_r \neq V_i$, an error signal is produced and amplified to appear at the output terminal. In the case where the temperature of the cladding 500 is lower than the desired temperature, $V_c$ is increased, which increases the current flowing through the resistance layer 200. On the contrary, in the case where the temperature of the cladding 500 is higher than the deviced temperature, $V_c$ is decreased, which acts so as to decrease the current flowing through the resistance layer. In this way the central wavelength shift is kept to be 0. The thermo-detecting element 15 may be mounted at any place on the upper surface of the cladding 500 and it may be mounted also within the cladding or the substrate.

Another embodiment of this invention will be explained below. Although the construction thereof is identical to that indicated in FIG. 1, the substrate may be made by a quartz plate apart from Si. At first a resistance layer serving as a heat generating body (made of e.g. chromium, cermet, etc.) is deposited on the surface thereof. It is left only on a predetermined portion and the other part is removed. The sheet resistance thereof is selected usually to be 1 to 10 kΩ/square. Then an SiO$_2$ layer is formed as a buffer layer and thereafter the light waveguide and the cladding layer are formed according to the steps described above, referring to FIG. 2.

The heat generating body may be a sheet or a fine pattern and it is not at all restricted.

Figure 3A:
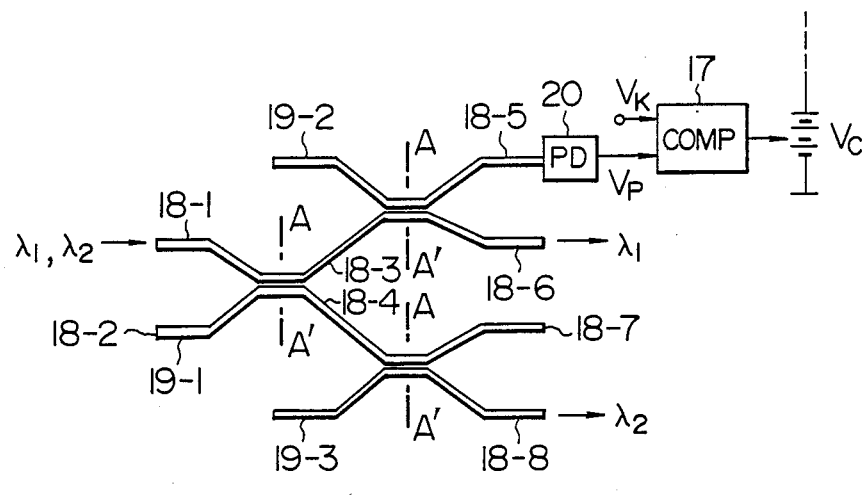
FIG. 3A is a scheme of another embodiment of this invention.
Figure 3B:
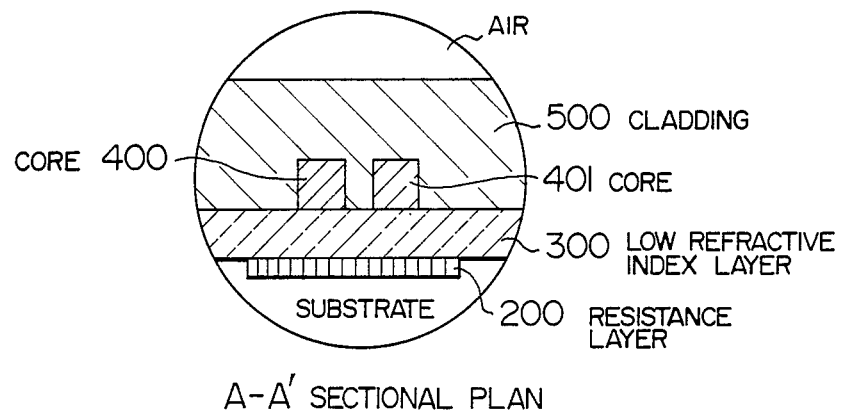
FIG. 3B is a cross sectional view along a line A—A' in FIG. 3A.
Figure 4A:
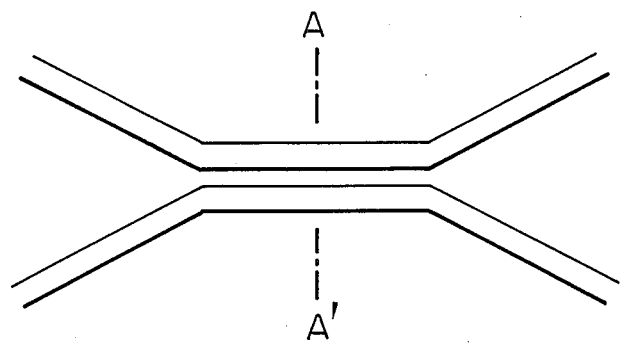
FIG. 4A is a scheme of a prior art waveguide type light merging and branching device.
Figure 4B:
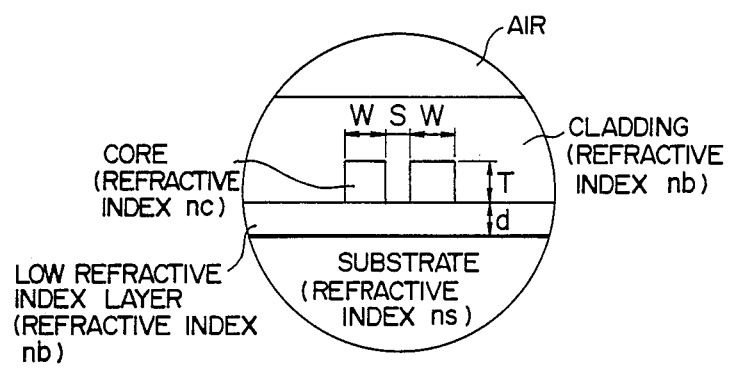
FIG. 4B is a cross sectional view along the line A—A' in FIG. 4A.
Figure 5A:
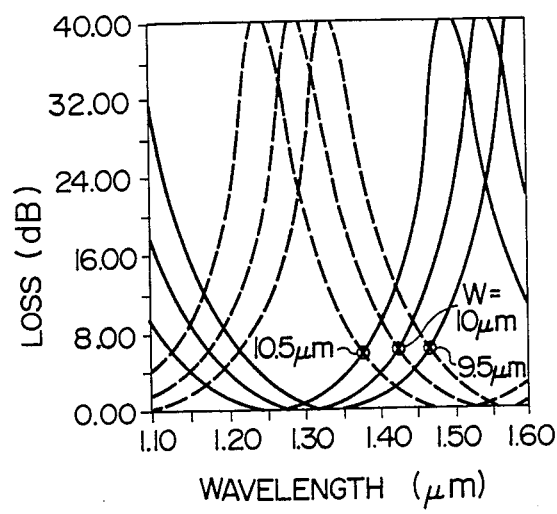
FIGS. 5A, 5B and 5C indicate results of the sensitivity analysis of the prior art waveguide type light merging and branching device.
Figure 5B:
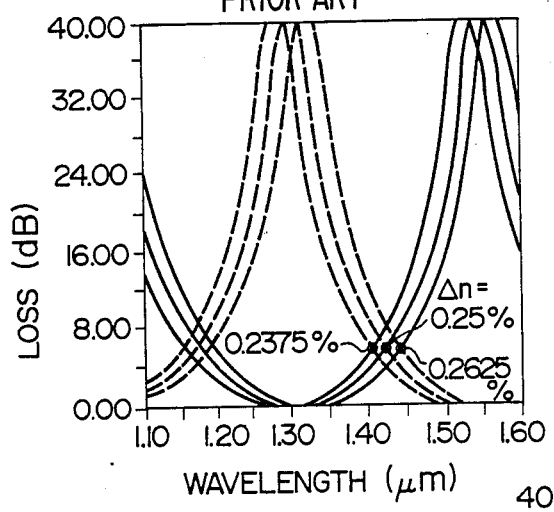
Figure 5C:
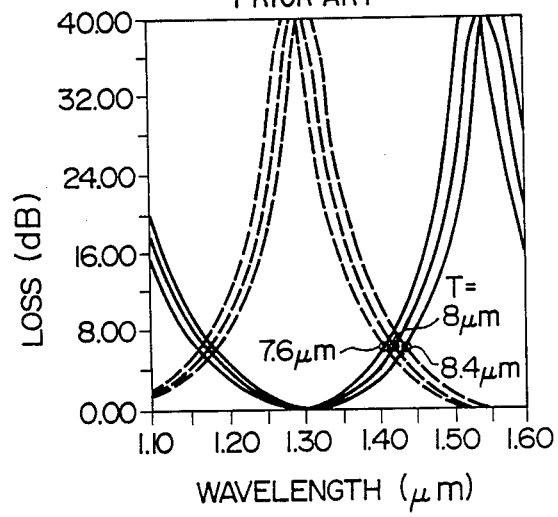

FIGS. 3A and 3B show another embodiment of the waveguide type light merging and branching device having the wavelength regulating function according to this invention. This is a waveguide type light merging and branching device composed of 3 optical directional couplers (19-1, 19-2, 19-3). Between light signals having wavelengths $\lambda_1$ and $\lambda_2$ injected in the input waveguide 18-1 a light signal having a wavelength $\lambda_1$ is outputted through an output waveguide 18-6 and the other light signal having the other wavelength $\lambda_2$ is outputted through another waveguide 18-8. In an ideal state no light signals of wavelengths $\lambda_1$ and $\lambda_2$ appear at output waveguides 18-5 and 18-7. That is, the light signals are branched into two, the light signal of wavelength $\lambda_1$ and that of wavelength $\lambda_2$ being sent to the waveguides 18-3 and 18-4, respectively. The optical directional coupler 19-2 (19-3) acts so as to suppress the not desired light signal $\lambda_2$ ($\lambda_1$) leaking to the waveguide 18-3 (18-4). However, the central wavelength in the light branching characteristics is shifted due to variations in constructional parameters during the fabrication process or variations in the temperature produced by variations in the environmental conditions. When the central wavelength is shifted, the light signals leak to the output waveguides 18-5 and 18-7. These light signals are detected by a photosensitive element 20 (e.g. photodiode) and transformed into electric signals $V_p$. This $V_p$ is inputted in the comparing circuit together with a reference voltage $V_k$ previously set (since, even if the central wavelength is not shifted, noise voltages and voltages generated by receiving reflected light coming from various waveguides are produced in the output of the photodiode, this reference voltage is a value determined by detecting previously the voltage corresponding to the sum of them). When $V_p \neq V_k$, the voltage $V_c$ applied to the resistance layer 200 disposed below the coupling portion of each of the optical directional couplers so that the central wavelength is corrected by varying the refractive index of the optical directional coupler.

This invention is not restricted to the embodiments described above. For example, the light merging and branching device may be used as an optical switch. The resistance layer 200 may be disposed in the neighborhood of the place, where the pattern of the optical directional coupler is arranged or at the plurality of places on the substrate.

According to this invention, since it is possible to correct automatically the central wavelength shift in the light branching characteristics due to variations in the constructional parameters during the fabrication process of the light merging and branching device and to variations in the environmental conditions, when it is used in a real system, owing to the electric feedback control, it is possible to suppress cross talk between channels due to interference between different wavelengths. Further, since the resistance layer for the central wavelength control can be used as a mark for mask alignment, when the waveguide pattern is formed by the photolithography, it is possible to realize a great area pattern with a high precision.

We claim:

1. A waveguide type light merging and branching device comprising:
    a substrate;
    a resistance layer arranged on at least one side of said substrate, having electrodes through which a voltage is applied;
    a low refractive index layer superposed on said substrate with the resistance layer;
    two core waveguide layers, arranged in parallel on said low refractive index layer;
    a cladding layer covering said two core waveguide layers; and
    thermo-detecting element disposed on said cladding, wherein the voltage applied to the resistance layer is varied by the output of said thermo-detecting element.

2. A waveguide type light merging and branching device comprising:
    (a) at least first, second and third optical directional couplers, each of which having two output and two input waveguides, each of said waveguides comprising:
    a substrate;
    a resistance layer arranged at least on one side of said substrate, said resistance layer having electrodes through which a voltage is applied;
    a low refractive index layer superposed on said substrate with said resistance layer;
    two core waveguide layers, arranged in parallel on said low refractive index layer; and
    a cladding layer covering said two core waveguide layers;
    (b) an input waveguide of said second and third optical directional coupler is connected with each of two output waveguides of said first optical coupler, respectively; and
    (c) a photosensitive element disposed at at least one of the two output waveguides of said second and third directional couplers, the voltage applied to said resistance layer being regulated by the output value of said photosensitive element so that said output value has a predetermined value.

* * * * *